3,100,205
CYCLOHEXANE DERIVATIVES
Karl Schulte, Darmstadt, Heinrich Müller, Pfungstadt, near Darmstadt, and Hans-Günther Kraft, Darmstadt, Germany, assignors to E. Merck Aktiengesellschaft, Darmstadt, Germany, a corporation of Germany
No Drawing. Filed May 11, 1961, Ser. No. 109,255
8 Claims. (Cl. 260—247.2)

This invention relates to derivatives of cyclohexane. More particularly, it is directed to cyclohexane derivatives of the following Formula I as well as their salts and quaternary ammonium compounds:

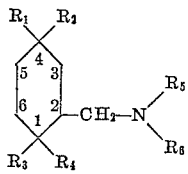
(I)

in which

R₁=phenyl, cyclohexyl or cyclohexenyl, which radicals may be substituted one or two times by halogen, OH, alkyl having at most 2 C-atoms, alkoxy having at most 3 C-atoms, or —O—CH₂—O—, R₂=CN, COOR₇, —CH₂NHCOOR₇ or

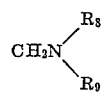

R₇=alkyl having at most 8 C-atoms,
R₈ and R₉=hydrogen, alkyl having at most 4 C-atoms or alkyl having at most 4 C-atoms which are connected with each other by CH₂, O or N,
R₃=H, alkoxy having at most 2 C-atoms, alkyl having at most 4 C-atoms, phenyl,
R₄=H, OH, alkoxy having at most 4 C-atoms, alkanoyloxy having at most 10 C-atoms, in which connection R₃ and R₄ may also together represent =O, =N—OH or ethylenedioxy,
R₅ and R₆ are H, alkyl having at most 6 C-atoms, hydroxy alkyl having at most 3 C-atoms, which alkyl radicals may be bound with each other via CH₂, O or N.

It has been found that the cyclohexane derivatives of the above Formula I as well as their salts and quaternary ammonium compounds develop an excellent cough-relieving action.

The new compounds of this invention can be prepared in a variety of ways. One can:

(a) React a cyclohexanone, which is disubstituted in 4-position, of Formula II:

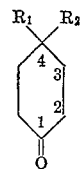
(II)

in which R₁ and R₂ have the significance indicated above, with formaldehyde and ammonia or an amine of Formula III:

(III)

in which R₅ and R₆ have the significance indicated above.

This Mannich condensation is advantageously carried out in aqueous-alcoholic solution; the ketone, the aqueous formaldehyde solution and the amine component being heated with the addition of acid. One can also proceed in the following manner: one mol of the ketone is reacted with about 1.1 to 1.2 mols of formaldehyde in aqueous solution and about 1.1 mols of an acid addition salt of the amine component. It may possibly be advisable, prior to the actual Mannich condensation, to prepare the oxymethylene compound from the formaldehyde and the amine and then to use it in the reaction with the ketone. Instead of an aqueous formaldehyde solution, paraformaldehyde or the trimeric form of formaldehyde in alcoholic, and preferably water-free alcoholic solution, can also be used. As the amine component, there may be used, in addition to ammonia, for instance, the following secondary or primary amines or their acid addition salts. Methylamine, ethylamine, n-propylamine, n- or iso-butylamine, dimethylamine, diethylamine, di-n-propylamine, di-n-butylamine, ethylmethylamine, ethylbutylamine, piperidine, morpholine, thiomorpholine, N-methylpiperazine, pyrrolidine, etc.

In the Mannich condensation, there is obtained a ketone of the general Formula IV:

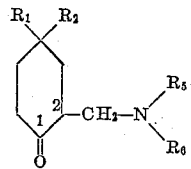
(IV)

in which R₁, R₂, R₅ and R₆ have the significance indicated above.

(b) The carbonyl oxygen of the ketone of Formula IV can be converted, by customary methods, into the substituents R₃ and R₄. For instance, the ketone can be hydrogenated in the presence of ordinary catalysts such as Raney nickel and in the presence of a solvent such as methanol, preferably under normal conditions or elevated pressure, for instance at 6 atmospheres gauge, as well as elevated temperature, to form the corresponding secondary alcohol. The carbonyl group of the compound of the Formula IV can also be converted into a corresponding tertiary alkyl group by reaction with organometallic compounds, for instance with Grignard compounds or alkali metal alkyls. The Grignard reaction can for instance be carried out in such manner that the ethereal solution of the ketone of Formula IV is added, drop by drop, preferably with cooling, to an ethereal Grignard solution and thereupon the reaction mixture is heated under reflux until the reaction is complete. The hydroxyl group obtained upon a treatment with organometallic compounds or upon hydrogenation from the carbonyl group can thereupon be esterified or etherified by customary methods. For example, the resultant alcohol can be esterified with an acid halide or anhydride in a suitable solvent, such as toluene, as well as in the presence of an agent which combines with acid, such as pyridine or potassium carbonate. The etherification of the hydroxyl group can take place via the sodium compound which is reacted with reactive organic halides, for instance, with ethyl iodide or benzyl chloride.

(c) The new cyclohexane derivatives can, in accordance with the present invention, furthermore be prepared by ordinary hydrogenation of a nitrile of Formula V:

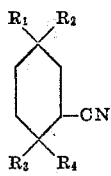

(V)

in which $R_1$ to $R_4$ have the significance indicated above.

The nitrile group of Compound V is in this connection converted either into an amino-methyl group or a substituted amin-methyl group, depending on the reaction conditions applied. If one operates under the customary hydrogenation conditions, for instance, with hydrogen in the presence of Raney nickel, the amin-methyl group is obtained. If the analogous hydrogenation is carried out in the presence of an amine of Formula III, there is obtained directly an amino-methyl group substituted with the radicals $R_5$ and $R_6$. Such hydrogenations are preferably carried out under elevated pressure and possibly at elevated temperature. As solvents, there is used, for instance, an alcohol such as methanol or a hydrocarbon such as cyclohexane, etc.

The nitrile of Formula V required as starting material can, for instance, be prepared by α-halogenation of a ketone of Formula II, followed by the reaction of the resultant 2-halogen ketone with alkali cyanide. A nitrile of Formula V can also be prepared from a γ,γ-disubstituted pimelic acid dinitrile by ring closure by the Ziegler method. In this case, there is obtained the 1-imino compound corresponding to the nitrile V in which the radicals $R_3$ and $R_4$ represent a =NH-group, which =NH can thereupon be hydrolyzed by customary methods to form the carbonyl group.

(d) In accordance with the invention, the new cyclohexane derivatives can also be obtained by replacing the substituent X of a cyclohexane derivative of Formula VI:

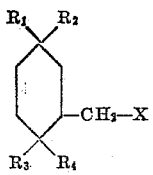

(VI)

in which $R_1$ to $R_4$ have the significance indicated above, and X is OH, Cl or Br, by an

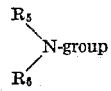

by customary methods.

If one starts with a compound of Formula VI in which X is halogen, the reaction can be carried out in an inert solvent such as toluene, and with the addition of an agent which combines with acid, for instance, potassium carbonate, by reacting the halogen compound with about 1 to 2 mols of an amine of Formula III or with ammonia. A larger excess of amine is not necessary, but is not injurious. The reaction is preferably carried out at the boiling point of the solvent employed.

(e) Another method of preparing new cyclohexane derivatives consists, in accordance with the invention, in reducing the CO-group of an acid amide of Formula VII:

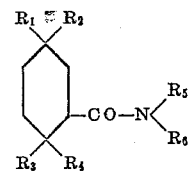

(VII)

in which $R_1$ to $R_6$ have the significance indicated above.

The reduction is advantageously effected by complex metal hydrides such as lithium aluminum hydride. The organo-metallic complexes which are first formed in this connection are thereupon decomposed in customary manner with water or ammonium chloride. As solvent for the reaction, diethyl ether, tetrahydrofuran or dioxane can, for instance, be used. If an unprotected carbonyl group is present in 1-position, it is converted by the complex metal hydride into a secondary hydroxyl group. It is therefore advisable, if the carbonyl group is to be retained, to protect it from the reaction, for instance, by ketalizing. Upon the decomposition of the metal hydride which then takes place, acid conditions must be avoided if the ketal group is to be retained. On the other hand, one can regenerate the carbonyl group during the acid decomposition and thus produce a compound of Formula I in which the substituents $R_3$ and $R_4$ together constitute oxygen.

The acid amides of Formula VII can be prepared by known methods from esters of the following Formula VIII:

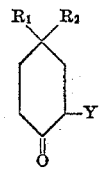

(VIII)

in which Y is an ester group, by reaction with an amine.

(f) In accordance with the invention, it is furthermore possible to convert a compound of Formula I by known methods into the corresponding acid addition salt, for instance, by treatment with hydrochloric acid or hydrobromic acid, acetic acid, tartaric acid, fumaric acid, maleic acid, citric acid, ascorbic acid, caproic acid, propionic acid, etc.

It is also possible to quaternize the nitrogen of a compound of Formula I by customary methods, as for instance, by treatment with alkyl halides.

The preparation of acid addition salts is particularly advantageous when water-soluble compounds suitable for injection purposes are to be prepared.

The compounds obtained in accordance with the invention have excellent cough-relieving properties. There have been found to be particularly effective those compounds of Formula I in which $R_1$ is phenyl or cyclohexenyl, $R_2$ is an ester group, $R_3$ is hydrogen, $R_4$ is O-acyl and $R_5$ and $R_6$, together with nitrogen, constitute a morpholine or piperidine radical.

In accordance with the invention, for example, the following final products or their acid-addition and quaternary salts can be obtained:

2-morpholinomethyl-4-carbomethoxy-4-phenyl-cyclohexane-1-one-hydrochloride, 2-pyrrolidinomethyl-4-carbomethoxy-4-phenyl-cyclohexane-1-one, 2-piperidinomethyl-4-carbomethoxy-4-phenyl-cyclohexane-1-one-hydrochloride, 2-octahydroindolinomethyl-4-carbomethoxy-4-phenyl-cyclohexane-1-one-hydrobromide, 2-diethylaminomethyl-4-carbomethoxy-4-phenyl-cyclohexane-1-one-hydrochloride, 2-piperidinomethyl-4-carbomethoxy-4-phenyl-cyclohexane-1-ol,
2-morpholinomethyl-4-carbomethoxy-4-phenyl-cyclohexane-1-ol.
(2-piperidinomethyl-4-carbomethoxy-4-phenyl)-cyclohexyl-1-acetate,
(2-morpholinomethyl-4-carbomethoxy-4-phenyl)-cyclohexyl-1-acetate,
(2-morpholinomethyl-4-carbomethoxy-4-phenyl)-cyclohexyl-1-propionate,
(2-morpholinomethyl-4-carbomethoxy-4-cyclohexenyl)-cyclohexyl-1-propionate,
2-morpholinomethyl-4-phenyl-4-carbo-octyloxy-cyclohexyl-1-acetate,
2-piperidinomethyl-4-phenyl-4-carbobutyloxy-cyclohexyl-1-propionate,
2-piperidinomethyl-4-cyclohexenyl-4-carbobutyloxy-cyclohexyl-1-acetate,
2-morpholinomethyl-4-(3',4'-dimethoxyphenyl)-4-carbomethoxy-cyclohexane-1-ol,
2-morpholinomethyl-4-(3',4'-dimethoxyphenyl)-4-carbomethoxy-cyclohexyl-1-propionate.

The new cyclohexane derivatives obtained in accordance with the invention were tested as to their cough-relieving action by the method of Konzett and Rothlin (Experientia, vol. 10, page 472 (1954). In comparative tests, it was found that the new compounds are superior in their action to known cough-relieving agents. Thus, for instance, the 2-piperidinomethyl-4-carbomethoxy-4-phenyl-cyclohexyl-1-acetate obtained in accordance with the invention and the 2-morpholinomethyl-4-carbomethoxy - 4 - phenyl - cyclohexane - 1 - one - hydrochloride are 3 times more effective than 2-dimethylamino-4-cyano-4-phenyl-5-methyl-hexane-citrate. The 2-octahydroindolinomethyl - 4 - carbomethoxy - 4 - phenyl - cyclohexane-1-one-hydrobromide prepared in accordance with the invention exhibited 1.5 times the cough-relieving action of piperidinoethoxyethyl thiophenyl-pyridyl-amino-(10)-carboxylate, while the 2-pyrrolidinomethyl-4-carbomethoxy - 4 - phenyl - cyclohexane - 1 - one showed 3 times the cough-relieving action thereof. The 2-piperidino - methyl - 4 - carbomethoxy - 4 - phenyl - cyclohexane-1-ol obtained in accordance with the method of the invention and the also unknown 2-diethylaminomethyl-4-carbomethoxy-4-phenyl-cyclohexane-1-one - hydrochloride had twice as strong a cough-relieving action as 1-phenyl-1-o-chlorophenyl-3-dimethylamino-propanol - 1 - hydrochloride. It was furthermore found that among the new compounds obtained in accordance with the invention, the 2-dimethylamino-methyl - 4 - carbomethoxy - 4 - phenyl-cyclohexyl - 1 - acetate, 2 - piperidinomethyl-4-cyano-4-phenyl-cyclohexane-1-one and 2-piperidinomethyl-4-carbomethoxy-4-phenyl-cyclohexane-1-one-hydrochloride develop a cough-relieving effect which is 2.5 to 3.5 times greater than that of 1,1-diphenyl-2-piperidino-propanol-1.

One important advantage of the new substances is particularly that they are not habit-forming and do not exert any action on the circulation. The use of the new compounds in human medicine is therefore considerably less dangerous than the use of compounds of the codeine type.

The new substances can be worked into all forms of preparations customary for pharmaceutical purposes, for instance, pills, dragees, tablets, emulsions, solutions, injection solutions, inhalation sprays, etc., can be prepared therefrom.

The following are examples in accordance with this invention:

Example 1

23.3 grams of 4-phenyl-4-carbomethoxy-cyclohexane-1-one, 17 grams of 35% aqueous formaldehyde and 9 grams of dimethylamino-hydrochloride are heated for 4 hours under reflux in 300 cc. of alcohol. The solvent is evaporated and the residue is treated with 50 cc. of 2 N-hydrochloric acid and extracted with ether. The aqueous phase is made alkaline with caustic soda solution while cooling and then exhaustively extracted with ether. After the drying and evaporation of the solvent, there is obtained 2-dimethylaminomethyl-4-phenyl-4-carbomethoxy-cyclohexane-1-one. The base can be converted into the hydrochloride of a melting point of 158 to 160° C. by customary methods.

Example 2

16 grams of 2-dimethylaminomethyl-4-carbomethoxy-4-phenyl-cyclohexane-1-one-hydrochloride are dissolved in 600 cc. of water, and the solution is shaken with 1 gram of pre-reduced platinum oxide under hydrogen until 0.05 mol of hydrogen have been absorbed. The solvent is thereupon substantially evaporated, the residue made alkaline and extracted with ether. After drying and evaporation of the solvent, there is obtained 2-dimethylaminomethyl - 4 - carbomethoxy - 4 - phenyl - cyclohexane-1-ol, B.P. 157°/0.2 mm. Hg. The hydrochloride prepared therefrom by customary methods melts at 199 to 200° C. M.P. of the 3,5-dinitro-benzoate: 250° C.

Example 3

6.6 grams of 2-dimethylaminomethyl-4-phenyl-4-carbomethoxy-cyclohexanol-hydrochloride are dissolved in 50 cc. of chloroform and heated for 2 hours under reflux with 1.6 grams of acetylchloride and 1.6 grams of pyridine. The residue remaining after the evaporation of the solvent is dissolved in a small amount of water, the solution is made alkaline with caustic soda solution and exhaustively extracted with ether. The residue remaining after the evaporation of the ether is recrystallized from 8 cc. of absolute alcohol. There is obtained 2-dimethylaminomethyl - 4 - phenyl - 4 - carbomethoxy - cyclohexyl-1-acetate of a melting point of 93 to 94° C.

Example 4

7.4 grams of 2-morpholinomethyl-4-carbomethoxy-4-phenyl-cyclohexane-1-one-hydrochloride are dissolved in 50 cc. of glacial acetic acid and shaken with 0.5 gram of pre-reduced platinum oxide under hydrogen until 0.08 mol of $H_2$ have been absorbed. Thereupon the solvent is removed and the residue is treated with dilute caustic soda solution and extracted with ether. After drying and evaporation of the ether, there is obtained 2-morpholinomethyl - 4 - carbomethoxy - 4 - cyclohexyl - cyclohexane-1-ol of a M.P. of 104 to 105° C. The hydrochloride prepared by customary methods melts at 172 to 173° C. (from isopropanol).

Example 5

2.96 grams of 2-piperidinomethyl-4-cyano-4-phenyl-cyclohexane-1-one are dissolved in 30 cc. of 1 N-hydrochloric acid and shaken with 0.5 gram of pre-reduced platinum oxide in 20 cc. of water under hydrogen until 0.03 mol $H_2$ have been absorbed. The solution is made alkaline with caustic soda solution and extracted with ether. After drying and evaporation of the solvent, there is obtained 2 - piperidinomethyl-4-aminomethyl-4-phenyl-cyclohexane-1-ol of an M.P. of 104° C.; hydrochloride M.P. 152° C.

Example 6

To a Grignard solution prepared from 17.2 grams of monobromobenzene in 100 cc. of ether, there is added, drop by drop, at room temperature, a solution of 20.3 grams of 2-dimethylaminomethyl-4-phenyl-4-cyano-cyclohexanone in 50 cc. of ether. After the addition has been completed, heating is effected for one hour under reflux. The cooled reaction mixture is poured into 300 cc. of ice water and treated with 150 cc. of 25% ammonium chloride solution and 16 cc. of concentrated ammonium hydroxide solution. Exhaustive extraction with ether is thereupon effected followed with drying over sodium sulfate whereupon the solvent is evaporated. There is obtained 1,4-diphenyl-2-dimethylaminomethyl-4-cyano-cyclohexane-1-ol, which can be converted in the customary manner into the hydrochloride of M.P. 250 to 251° C.

Example 7

7.35 grams of 2-morpholinomethyl-4-phenyl-4-carbomethoxy-cyclohexanone, 4.2 grams of hydroxylamino-hydrochloride and 30 cc. of pyridine are heated for 2 hours on steam baths with the addition of 40 cc. of alcohol. The 2-morpholinomethyl-4-carbomethoxy-4-phenyl-cyclohexanone-oxime-hydrochloride which crystallizes out after a small amount of water has been added to the cold solution is recrystallized from methanol. M.P. 208° C.

Example 8

12.1 grams of 2,4-dicyano-4-phenyl-cyclohexane-1-one are dissolved in 3 liters of warm methanol and hydrogenated in the presence of 6 grams of platinum oxide with the addition of 36 grams of hydrogen chloride. After 2 mols of hydrogen have been absorbed, the hydrogenation is interrupted, the filtrate freed from the catalyst is concentrated under reduced pressure and 200 cc. of water are added to the oily residue. The residue is made alkaline with caustic soda solution and potash and exhaustively extracted with ether. By distillation of the residue obtained after the drying and evaporation of the solvent, there is obtained 2,4-diamino-methyl-4-phenyl-cyclohexane-1-ol of a boiling point of 124 to 128° C./0.05 mm. Hg, which can be converted into the dihydrochloride of a M.P. of 305° C. by customary methods.

Example 9

26.3 grams of 2-hydroxymethyl-4-phenyl-4-carbomethoxy-cyclohexane-1-one and 24.3 grams of piperidine-hydrochloride are heated in 250 cc. of alcohol for 5 hours under reflux. Thereupon the alcohol is substantially evaporated off, whereupon 50 cc. of 2 N-hydrochloric acid are added to the residue and it is extracted with ether. The aqueous phase is made alkaline while cooling and exhaustively extracted with ether. After drying and evaporation of the solvent, the unreacted piperidine is distilled off in a high vacuum and the resultant 2-piperidino-methyl-4-carbomethoxy-4-phenyl-cyclohexanone is recrystallized from isopropanol. M.P. 105° C.

Example 10

A solution of 12.8 grams of 2-oxo-5-phenyl-5-cyano-cyclohexane-1-carboxylic-acid-methyl-amide in 150 cc. tetrahydrofuran is added, drop by drop, with agitation, at 25 to 30° C. to 30.4 grams of lithium alanate in 150 cc. of tetrahydrofuran. After completion of the addition, heating is effected for 5 hours under reflux, followed after cooling by decomposition with water. The organic phase is removed, and aqueous phase is exhaustively extracted with chloroform and dried and the solvent evaporated. There is obtained 2-methyl-amino-methyl-4-phenyl-4-aminomethyl-cyclohexane-1-ol of a B.P. of 174 to 179° C./0.01 mm. Hg.

Example 11

2.1 grams of 2-dimethylaminomethyl-4-phenyl-4-carbomethoxy-cyclohexane-1-ol are dissolved in 10 cc. of acetonitrile, whereupon 5.0 grams of octyl bromide are added and the solution is maintained for 20 days at 60° C. It is thereupon concentrated and the N-(2-hydroxy-5-phenyl-5-carbomethoxy)-cyclohexylmethyl-N,N-dimethyl-N-octyl-ammonium bromide obtained is recrystallized from acetone.

The following compounds were prepared in a manner similar to the methods described in the above examples:

| Ex. | $R_1$ | $R_2$ | $R_3$ | $R_4$ | $R_5$ | $R_6$ | $R_7$ | $R_8$ | $R_9$ | |
|---|---|---|---|---|---|---|---|---|---|---|
| 12 | $C_6H_5$ | $CO_2CH_3$ | | =O | $C_6H_5$ | $-CH_2-CH_2-CH_2-CH_2-$ | $CH_3$ | | | Hydrochloride Fp. 140-142°. |
| 13 | $C_6H_5$ | $CO_2CH_3$ | | =O | | $-CH_2-CH_2-CH_2-CH_2-$ | $CH_3$ | | | Fp. 105°; hydrochloride Fp. 136°. |
| 14 | p-Br-$C_6H_4$ | $CO_2CH_3$ | | =O | | $-CH_2-CH_2-CH_2-CH_2-$ | $CH_3$ | | | Hydrochloride Fp. 137-138°. |
| 15 | $C_6H_5$ | $CO_2CH_3$ | | =O | | $-CH_2-CH_2-O-CH_2-CH_2-$ | $CH_3$ | | | Hydrochloride Fp. 152°. |
| 16 | $C_6H_5$ | $CO_2CH_3$ | | =O | | $-CH_2-CH_2-OH$ $\mid -CH_2-CH_2-CH_2-OH$ | $CH_3$ | | | Hydrochloride Fp. 105°. |
| 17 | $C_6H_5$ | $CO_2CH_3$ | | =O | | $-CH_2-CH_2-N-CH_2-CH_2-$ $\mid$ $CH_3$ | $CH_3$ | | | Hydrochloride Fp. 144°. |
| 18 | $C_6H_5$ | $CO_2CH_3$ | | =O | | (cyclohexyl with CH₃, CH₃, H) | $CH_3$ | | | Hydrobromide Fp. 177°. |
| 19 | $C_6H_5$ | $CO_2CH_3$ | | =O | $-CH_3$ | $-CH_3$ | $CH_3$ | | | Hydrobromide Fp. 148-150°. |
| 20 | $C_6H_5$ | CN | | =O | | $-CH_2-CH_2-CH_2-CH_2-$ | | | | Hydrobromide Fp. 157-158°. |
| 21 | $C_6H_5$ | CN | | =O | | | | | | Fp. 93-95°. |
| 22 | $C_6H_5$ | $CO_2CH_3$ | | —OH | | $-(CH_2)_5-$ | $CH_3$ | | | B.P. 182°/0.2 Torr; 3,5-dinitrobenzoate Fp. 245°; hydrochloride Fp. 189°; fumarate Fp. 131-133°. |

| Ex. | $R_1$ | $R_2$ | $R_3$ | $R_4$ | $R_5$ | $R_6$ | $R_7$ | $R_8$ | $R_9$ |
|---|---|---|---|---|---|---|---|---|---|
| 23 | $C_6H_5$ | $CO_2CH_3$ | H | $O-COCH_3$ | —$CH_2$—$CH_2$—$CH_2$—$CH_2$—$CH_2$— | | $CH_3$ | | B.P. 190-192°/0.4 Torr. |
| 24 | $C_6H_5$ | $CO_2CH_3$ | H | OH | —$CH_2$—$CH_2$—O—$CH_2$—$CH_2$— | | $CH_3$ | | B.P. 178-180°/0.1 Torr. |
| 25 | $C_6H_5$ | $CO_2CH_3$ | H | $O-COCH_3$ | —$CH_2$—$CH_2$—O—$CH_2$—$CH_2$— | | $CH_3$ | | B.P. 194-195°/0.2 Torr. |
| 26 | $C_6H_5$ | $CO_2CH_3$ | H | OH | —$C_2H_5$ | —$C_2H_5$ | $CH_3$ | | B.P. 160-162°/0.1 Torr. |
| 27 | $C_6H_5$ | $CO_2CH_3$ | H | $O-COCH_3$ | —$C_2H_5$ | —$C_2H_5$ | $CH_3$ | | B.P. 196-198°/0.05 Torr. |
| 28 |  | $CO_2CH_3$ | H | OH | —$(CH_2)_5$— | | $CH_3$ | | B.P. 172-173°/0.1 Torr. |
| 29 |  | $CO_2CH_3$ | H | OH | —$CH_3$ | $CH_3$ | | | B.P. 168-170°/0.05 Torr. |
| | | | | | | | | | Fp. 75°. |
| 30 | $C_6H_5$ | $CO_2CH_3$ | H | $O-CO-C_2H_5$ | $CH_2$—$CH_2$—O—$CH_2$—$CH_2$— | | $CH_3$ | | B.P. 203-205°/0.3 Torr. |
| 31 | $C_6H_5$ | $CO_2$—i-$C_4H_9$ | H | $O-CO-C_2H_5$ | $CH_2$—$CH_2$—O—$CH_2$—$CH_2$— | | i-$C_4H_9$ | | |
| 32 |  | $CO_2$—i-$C_4H_9$ | H | $O-CO-C_2H_5$ | $CH_2$—$CH_2$—O—$CH_2$—$CH_2$— | | $CH_3$ | | B.P. 188-190°/0.3 Torr. |
| 33 | $C_6H_5$ | $CO_2CH_3$ | H | $O-COC_5H_{11}$ | —$(CH_2)_5$— | | $CH_3$ | | B.P. 197-199°/0.01 Torr. |
| 34 | p-$CH_3$—$C_6H_4$ | $CO_2C_2H_5$ | H | OH | $CH_3$ | $CH_3$ | $C_2H_5$ | | B.P. 163-165°/0.1 Torr. |
| 35 | $CH_3O$— | $CO_2CH_3$ | H | OH | $C_2H_5$ | $C_2H_5$ | $CH_3$ | | B.P. 179-181°/0.05 Torr. |
| 36 | O—OHC$_6H_4$ | $CO_2CH_3$ | H | $O-COCH_3$ | $CH_3$ | $CH_3$ | $CH_3$ | | B.P. 194-196°/0.05 Torr. |
| 37 | | $CO_2C_2H_5$ | H | $O-COC_2H_5$ | $CH_3$ | $CH_3$ | —$C_2H_5$ | | B.P. 174-178°/0.05 Torr. |
| 38 |  | —$CH_2$—NH—$CoCC_2H_5$ | H | OH | —$CH_3$ | —$(CH_2)_5$— | $CH_3$ | | B.P. 176-178°/0.1 Torr. |
| 39 | $C_6H_5$ | —$CH_2$—NH—$CoC_2H_5$ | H | OH | —$CH_3$ | —$CH_3$ | —$C_2H_5$ | | B.P. 202-204°/0.05 Torr. |
| 40 | $C_6H_5$ | —$CH_2$—NH—$CoC_2H_5$ | H | —O—$COCH_3$ | $CH_3$ | —$CH_3$ | —$C_2H_5$ | | B.P. 198-200°/0.05 Torr. |

| Ex. | $R_1$ | $R_2$ | $R_3$ | $R_4$ | $R_5$ | $R_6$ | $R_7$ | $R_8$ | $R_9$ | B.P. |
|---|---|---|---|---|---|---|---|---|---|---|
| 41 | $C_6H_5$ | $-CH_2-N\begin{smallmatrix}CH_3\\CH_3\end{smallmatrix}$ | H | OH | $C_2H_5$ | $C_2H_5$ | — | $CH_3$ | $CH_3$ | B.P. 155–157°/0.01 Torr. |
| 42 | $C_6H_5$ | $-CH_2-NH-C_2H_5$ | H | OH | H | $-(CH_2)_5-$ | — | H | $C_2H_5$ | B.P. 165–166°/0.05 Torr. |
| 43 | $C_6H_5$ | $-CH_2-NH-C_2H_5$ | H | OH | H | $-(CH_2)_5-$, $-C_2H_5$ | — | H | $C_2H_5$ | B.P. 169–163°/0.1 Torr. |
| 44 | $C_6H_5$ | CN | H | $-O-CH_2-CH_2-O-$ | | | — | | | B.P. 194–196°/0.01 Torr. |
| 45 | $C_6H_5$ | $CO_2CH_3$ | H | $O-CO-C_2H_5$ | $-CH_2-CH_2-O-CH_2-CH_2-$ | | — | | | B.P. 174–176°/0.05 Torr. |
| 46 | $C_6H_5$ | $CO_2C_8H_{17}$ | H | $O-COCH_3$ | $-CH_2-CH_2-O-CH_2-CH_2-$ | | $-C_8H_{17}$ | | | B.P. 204–206°/0.05 Torr. |
| 47 | $C_6H_5$ | $CO_2-C_4H_9$ | H | $O-CO-C_2H_5$ | $-(CH_2)_2-$ | | $-C_4H_9$ | | | B.P. 201–203°/0.1 Torr. |
| 48 | $C_6H_5$ | $CO_2-C_4H_9$ | H | $O-COCH_3$ | $-(CH_2)_2-$ | | $-C_4H_9$ | | | B.P. 191–194°/0.05 Torr. |
| 49 | (3,3',4,4'-tetramethoxybiphenyl) | $CO_2CH_3$ | H | OH | $-CH_2-CH_2-O-CH_2-CH_2-$ | | $CH_3$ | | | B.P. 204–206°/0.05 Torr. |
| 50 | (3,3',4,4'-tetramethoxybiphenyl) | $CO_2CH_3$ | H | $O-CO-C_2H_5$ | $-CH_2-CH_2-O-CH_2-CH_2-$ | | $CH_3$ | | | B.P. 206–208°/0.05 Torr. |
| 51 | (3,4-methylenedioxyphenyl) | $CO_2CH_3$ | H | OH | $CH_3$ | $CH_3$ | $CH_3$ | | | B.P. 170–172°/0.05 Torr. |
| 52 | $C_6H_5$ | $CO_2CH_3$ | $-C_2H_5$ | OH | $CH_3$ | $-(CH_2)_5-$ | $CH_3$ | | | B.P. 188–191°/0.1 Torr. |
| 53 | $C_6H_5$ | $-CH_2-N\!\!\bigcirc$ (piperidino) | H | OH | $CH_3$ | $CH_3$ | — | $-CH_2-CH_2-CH_2-CH_2-CH_2-$ | | B.P. 165–167°/0.01 Torr. |
| 54 | $C_6H_5$ | $-CH_2-N\!\!\bigcirc\!O$ (morpholino) | H | OH | $CH_3$ | $CH_3$ | — | $-CH_2-CH_2-O-CH_2-CH_2-$ | | B.P. 166–168°/0.01 Torr. |

In accordance with the foregoing methods, the following compounds can, likewise, be prepared:

4-(para-propoxy)phenyl - 4 - carbomethoxy - 2 - dimethyl-amino-methyl-cyclohexane-1-one
1,1-diethoxy-2-dimethylaminomethyl - 4 - phenyl-4-carbomethoxy-cyclohexane
1-butyl-2-piperidinomethyl-4-phenyl-4-cyano-cyclohexane-1-ol
1,4-diphenyl-2-dimethylaminomethyl - 4 - cyano-cyclohexane-1-ol
(2-dimethylaminomethyl - 4 - phenyl - 4 - carbomethoxy)-cyclohexyl-caprinate
2 - dimethylaminomethyl-4-phenyl-4-carbomethoxy-cyclohexane-1-one-propylene ketal
2-N-hexyl-N-methylaminomethyl-4-phenyl-4-cyano-cyclohexane-1-one
2 - dimethylaminomethyl-4-phenyl-4-carbobenzoxy-cyclohexane-1-one
2-piperidinomethyl-4-phenyl - 4 - N - butyl-amino-methyl-cyclohexane-1-ol
2-dimethylaminomethyl-4-phenyl - 4 - morpholino-methyl-cyclohexane-1-one
2 - dimethylaminomethyl - 4 - phenyl-4-piperidino-methyl-cyclohexane-1-one It will be understood that the foregoing description of the invention and the examples set forth are merely illustrative of the principles thereof. Accordingly, the appended claims are to be construed as defining the invention within the full spirit and scope thereof.

We claim:

1. 2-piperidinomethyl - 4 - carbomethoxy -4-phenylcyclohexane-1-one-hydrochloride.
2. 2-piperidinomethyl-4-carbomethoxy - 4 - phenylcyclohexane-1-ol.
3. (2 - piperidinomethyl-4-carbomethoxy-4-phenyl)-cyclohexanol-1-acetate.
4. 2 - morpholinomethyl-4-phenyl-4-carboctoxy-cyclohexanol-1-acetate.
5. 2 - piperidinomethyl-4-phenyl-4-carbobutoxy-cyclohexanol-1-propionate.
6. 2 - morpholinomethyl-4-(3',4'-dimethoxyphenyl)-4-carbomethoxy-cyclohexane-1-ol.
7. 2 - morpholinomethyl-4-(3',4'-dimethoxyphenyl)-4-carbomethoxy-cyclohexanol-1-propionate.
8. A compound selected from the group consisting of:
   (1) a compound having the formula

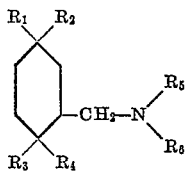

(2) The pharmaceutically acceptable acid addition salts thereof, and
(3) the quaternary ammonium compounds thereof wherein the quaternizing moiety is a member of the group consisting of alkylchloride and alkylbromide each having a maximum of 8 carbon atoms; and
wherein:
   $R_1$ designates a member of the group consisting of phenyl, cyclohexyl, cyclohexenyl, and mono- and di-substituted phenyl whereof the substituent is a member of the group consisting of bromine, hydroxyl, alkyl having at most 4 carbon atoms, alkoxy having a maximum of 3 carbon atoms, and methylene dioxy;
   $R_2$ designates a member of the group consisting of —CN,
   COOR$_7$,
   CH$_2$NHCOOR$_7$, and

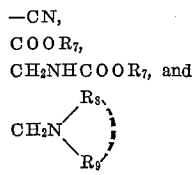

wherein:
   $R_7$ designates an alkyl having a maximum of 8 carbon atoms;
   $R_8$ and $R_9$ designate a member of the group consisting of hydrogen and alkyl having a maximum of 4 carbon atoms;
   $R_8$ and $R_9$, when linked together, jointly with the nitrogen atom, form a member selected from the group consisting of piperidino, morpholino, and piperazino;
   $R_3$ designates a member of the group consisting of hydrogen, alkoxy having a maximum of 2 carbon atoms, alkyl having a maximum of 4 carbon atoms, and phenyl;
   $R_4$ designates a member of the group consisting of hydrogen, hydroxyl, alkoxy having a maximum of 4 carbon atoms and alkanoyloxy having a maximum of 10 carbon atoms;
   $R_3$ and $R_4$ jointly designate a member of the group consisting of =O, =NOH, and ethylenedioxy;
   $R_5$ and $R_6$ designate a member of the group consisting of hydrogen, alkyl having a maximum of 6 carbon atoms, and hydroxyalkyl having a maximum of 3 carbon atoms; and when linked together, jointly constitute with the nitrogen atom a member of the group consisting of pyrrolidino, piperidino, morpholino, and N'-methyl-piperazino.

References Cited in the file of this patent

Martin et al.: "J. Am. Chem. Soc.," vol 68, pages 828–832, 1946.